(12) United States Patent
Beer et al.

(10) Patent No.: US 6,648,146 B2
(45) Date of Patent: Nov. 18, 2003

(54) SUCTION OIL FILTER FOR TRANSMISSIONS OR ENGINES WITH A MOVABLE SUCTION TUBE

(75) Inventors: Markus Beer, Morsbach (DE); Marco Rosendahl, Morsbach (DE)

(73) Assignee: SPX Corporation, Charlotte, NC (US)

( * ) Notice: Subject to any disclaimer, the term of this patent is extended or adjusted under 35 U.S.C. 154(b) by 101 days.

(21) Appl. No.: 10/076,305

(22) Filed: Feb. 19, 2002

(65) Prior Publication Data

US 2003/0132157 A1 Jul. 17, 2003

(51) Int. Cl.[7] .............. B01D 35/02; F01M 11/03
(52) U.S. Cl. ............. 210/405; 210/168; 210/171; 210/172; 210/450; 210/456; 210/462
(58) Field of Search ............... 210/168, 171, 210/172, 405, 416.5, 435, 445, 450, 455, 456, 462; 184/6.2, 6.24, 106; 123/196 A; 475/159; 222/189.1

(56) References Cited

U.S. PATENT DOCUMENTS 1,694,770 A * 12/1928 Cram .................... 210/460

| | | | |
|---|---|---|---|
| 3,017,898 A | 1/1962 | Hobson | 137/590 |
| 3,727,725 A | 4/1973 | Dahm | 184/6.24 |
| 4,056,168 A | 11/1977 | Bajohr | 184/6.24 |
| 4,250,039 A * | 2/1981 | Cozzi et al. | 210/416.5 |
| 4,561,977 A * | 12/1985 | Sasaki | 210/356 |

FOREIGN PATENT DOCUMENTS

| | | |
|---|---|---|
| DE | 1113610 | 9/1961 |
| DE | 3022443 | 12/1981 |
| DE | 10003710 | 8/2001 |

* cited by examiner

Primary Examiner—Matthew O. Savage
(74) Attorney, Agent, or Firm—Baker & Hostetler LLP

(57) ABSTRACT

A suction oil filter for transmissions or engines with a top shell, a bottom shell, with an oil intake opening and an oil outlet, said suction oil filter being positioned in an oil pan or in the transmission housing, characterized in that the oil intake opening has arranged therein a movable intake tube which is pressed by resilient means mounted on the inside of the intake tube outwards onto the oil pan base or the transmission housing and an oil intake opening is thus created at a defined constant distance from the oil pan base or transmission housing.

10 Claims, 2 Drawing Sheets

Filter medium omitted

Filter medium omitted

SUCTION OIL FILTER FOR TRANSMISSIONS OR ENGINES WITH A MOVABLE SUCTION TUBE

FIELD OF THE INVENTION

The invention is directed to a suction oil filter for transmissions or engines with a top shell 1, a bottom shell 2, with an oil suction opening 3 and an oil outlet 4, said suction oil filter being positioned in an oil pan or in the transmission housing.

BACKGROUND OF THE INVENTION

Nowadays, suction oil filters are conventionally used in automatic transmissions to filter transmission oil. Suction oil filters are installed in transmissions in different ways. Usually the filters are screwed onto the control device situated above them or onto the transmission housing, and the filter is usually positioned on the underside of the transmission housing. There are also other uses in which the suction oil filter is integrated in the oil pan or within the transmission housing. To fasten the suction oil filter, the oil filter outlet is first inserted with the aid of a seal into a corresponding transmission opening and the oil pan or halves of the transmission are subsequently fitted. In these uses, the filter is held in its position solely by the oil pan or transmission halves and by its fastening and fixture at the oil outlet. In some cases springs are employed in the oil pan in order to keep the suction oil filter in a constant position in the transmission.

However, this set-up yields considerable disadvantages, particularly in the operation and fastening of the suction oil filter. Firstly, it is possible for the suction oil filter during operation to become displaced in its intake position owing to the given tolerances, thus resulting in changes in transmission oil flow. In particular, this can have an effect on the oil volume. The latter must be maintained in such a way that the intake position of the suction oil filter always remains completely below the oil surface level, whatever the vehicle position. Since the oil volume varies owing to the tolerances arising during fastening and owing to the possibility of displacement, a relatively large quantity of oil must be kept in circulation for functional reasons. This is costly and is a source of additional technical problems and costs on other functionally important transmission components.

Furthermore, more recent transmissions, e.g. CVT transmissions, which are hydraulically controlled with electronics or pressure-dependently, react very sensitively to pressure variations or to the incorrect intake of air which may arise during oil filtration with conventionally fastened suction oil filters as a result of displacements or tolerances. This may result in malfunctions of the hydraulic control of CVT transmissions or even in transmission failure due to disablement of the hydraulic control.

SUMMARY OF THE INVENTION

The technical object of the invention is therefore to provide a suction oil filter which is positioned in the oil pan or transmission in such a way that a defined distance is assured between the oil intake opening and the oil pan base or transmission housing so that the tolerances of the required oil flow can be reduced and so that uniform oil flow and trouble-free function are assured.

This technical object is achieved by a suction oil filter for transmissions or engines which has arranged in the intake opening 3 a movable intake tube 5 which is pressed by resilient means 6 mounted on the inside of the intake tube 5 outward onto the oil pan base 8, thus creating an oil intake opening at a defined constant distance from the oil pan base or transmission housing.

The suction oil filter can be positioned in an oil pan. However, it is also possible for the suction oil filter to be positioned in the transmission housing directly. In the latter case, no oil pan is necessary as the transmission housing performs the function of the oil pan.

In a preferred embodiment, the resilient means is a spring which presses onto the movable intake tube 5 and thus preloads the intake tube. In another preferred embodiment, the oil suction opening 3 is situated in the bottom shell 2 of the suction oil filter. In a preferred embodiment, the intake tube 5 has on its outside one or more spacers 7 which in a particularly preferred embodiment can be pin-shaped. When the suction oil filter is installed in the oil pan or in the transmission housing, the intake tube rests upright with this pin on the oil pan base or in the transmission housing, whereby the intake tube 5 is pressed by the spring against the base or the transmission housing. This creates a defined distance between the intake opening and the oil pan base or transmission housing which always remains constant while the vehicle is in motion and independently of the viscosity of the oil or any vibrations and driving situations.

In another preferred embodiment, the intake tube has on its inside another spring guide pin 9, on which one end of the spring 6 is mounted. The other end of the spring 6 is mounted in a preferred embodiment against the top shell of the suction oil filter or pin of the top shell.

The suction tube 5 also has sealing means 10 in order to ensure the sealing of the outer rim of the intake tube against the inner rim of the intake opening and in order that oil flow takes place exclusively through the intake tube. An O-ring is preferably employed as the sealing means.

Furthermore, the intake tube 5 has at its top end a continuous or discontinuous all-round swelling 11 so that the intake tube cannot slide down out of the intake opening. In its uninstalled state, the intake tube is pressed outward as far as it will go by the spring arranged in the suction oil filter until the all-round swelling comes to rest against the edge of the oil pan base. In its installed state, the intake tube 5 is pressed back into the housing of the suction oil filter partly by the oil pan base or transmission housing and then remains under tension in a defined position.

The suction oil filter is installed in the transmission in the conventional manner, said suction oil filter being initially inserted so that it rests against the control device or the transmission housing, and preferably against the underside of the transmission housing. Due to the subsequent mounting of the oil pan, the movable intake tube 5 is now preloaded further and pressed into a predefined position. By means of the preferably positioned spacers on the underside of the intake tube, a constant distance between the intake opening and the oil pan or transmission housing is set in a design-related fashion. Furthermore, the suction oil filter is fixed due to the design in the given transmission position. No other fastening elements are required.

The suction filter according to the invention has considerable advantages over the suction filters of the prior art. A defined, constant distance is created between the suction oil opening and the oil pan base or transmission housing. There is also a compensation of the tolerances of the transmission housing, oil pan, control device and suction oil filter. Furthermore, no further fastening of the suction oil filter is necessary, and the suction oil filter is thus very easy to install.

BRIEF DESCRIPTION OF THE DRAWINGS

The invention is explained in greater detail by means of the following figures.

DETAILED DESCRIPTION OF THE INVENTION

Figure 1:
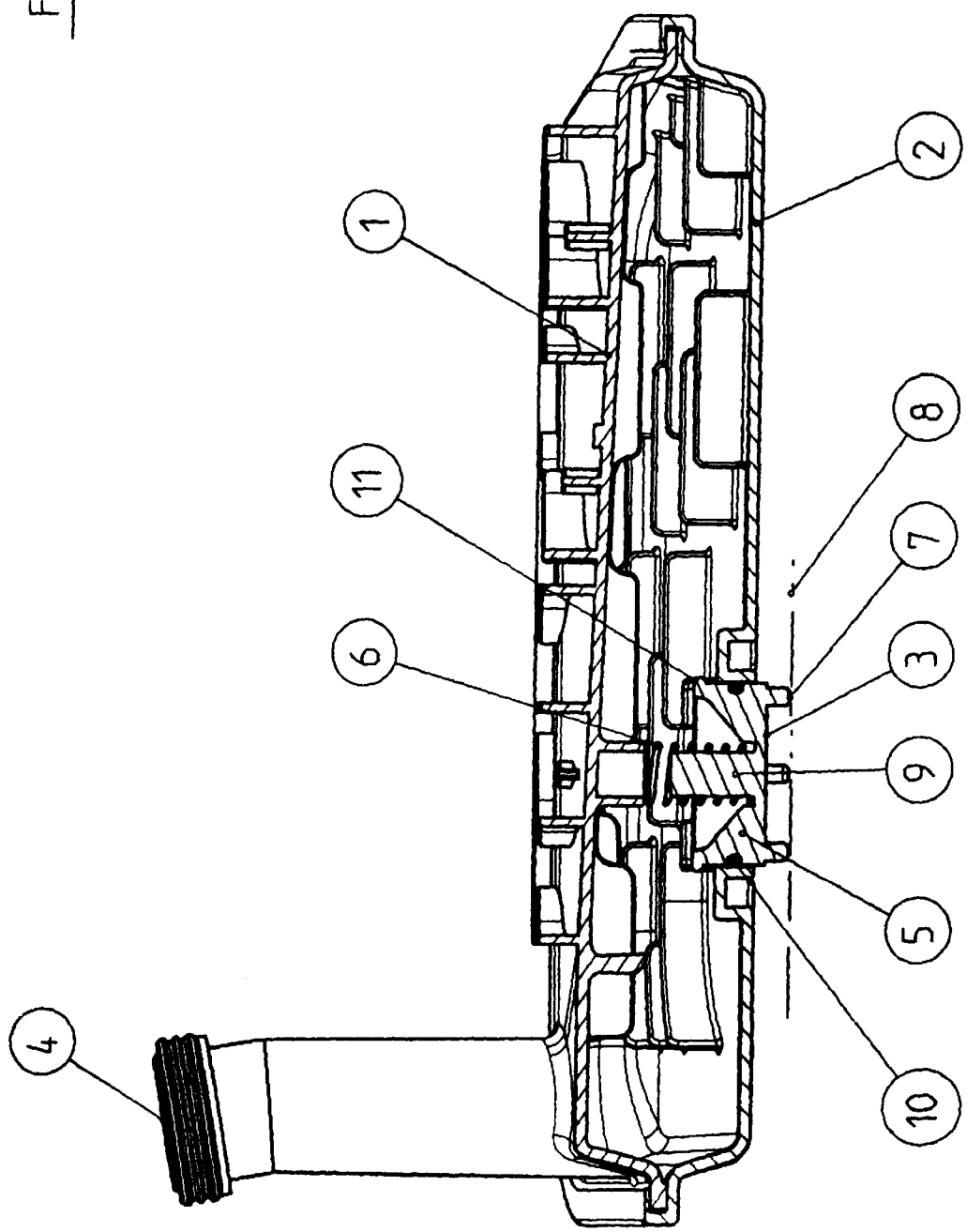
FIG. 1 shows a cross section through the inventive suction oil pan.

FIG. 1 shows a cross section through the inventive suction oil pan. Numbers 1 and 2 designate the top and bottom shells of the suction oil filter, number 3 the oil intake opening which represents the oil inlet, and number 4 the oil outlet. Number 5 designates the movably mounted intake tube which is sealed against the bottom shell by a seal 10 so that the oil can only enter the filter via the interior of the intake tube. On its inside the intake tube has a pin 9 on which the spring 6 is mounted. The spring presses on the other side against the top shell 1 or ribs of the top shell. On its underside the intake tube has one or more spacers 7 which in its installed state rest on the oil pan base or transmission housing and thus ensure a defined distance between the intake opening and the oil pan base or transmission housing. On its top part the intake tube 5 has a continuous or discontinuous all-round swelling 11 which ensures that the intake tube in its uninstalled state does not drop out of the intake opening.

Figure 2:
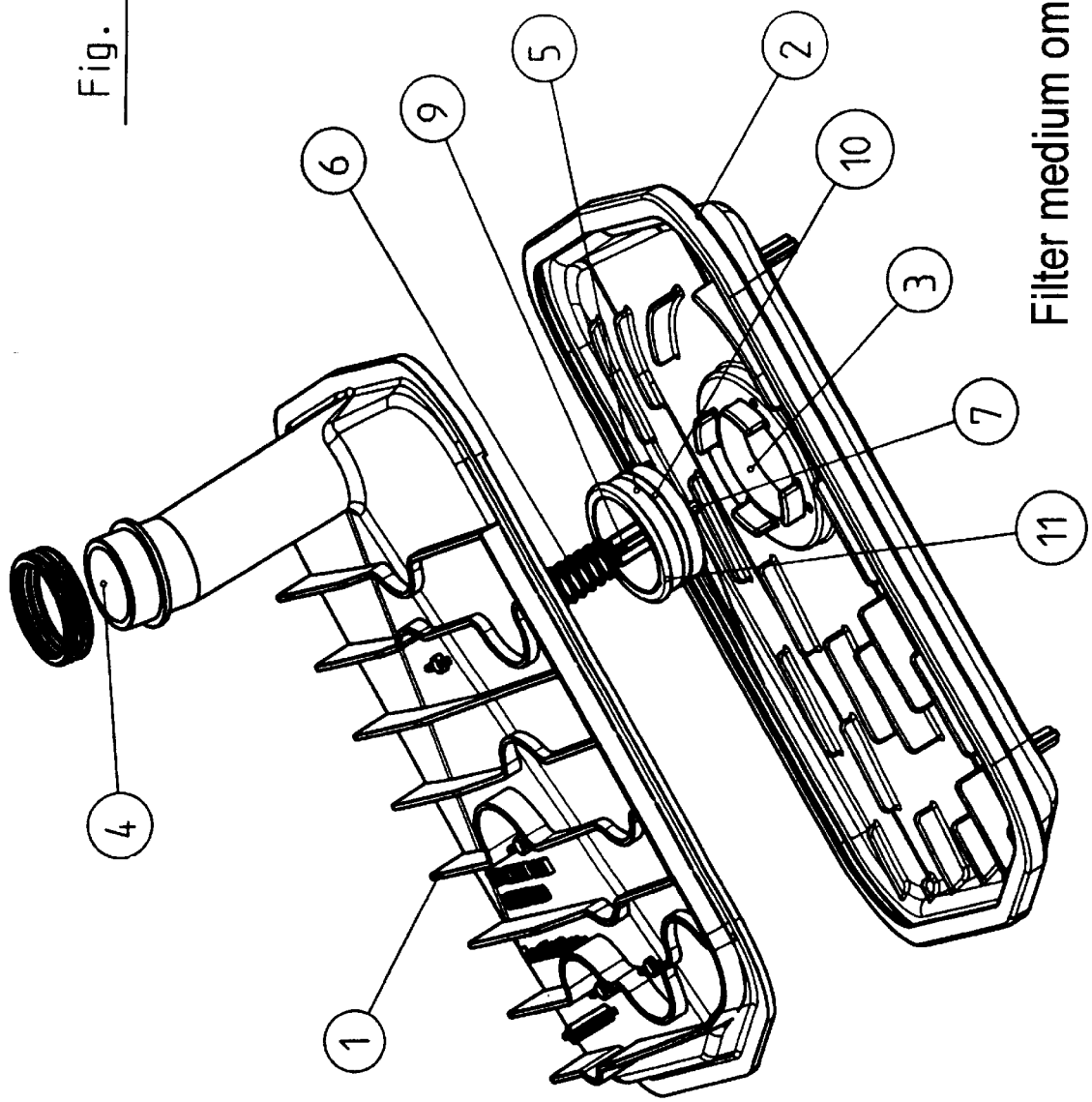
FIG. 2 shows an exploded view of the inventive suction oil filter.

FIG. 2 shows an exploded view of the inventive suction oil filter with the top shell 1, bottom shell 2, oil intake opening 3 and oil outlet 4. Number 5 designates the intake tube. Also designated are the O-ring 10 and the spacers 7 arranged at the lower end of the intake tube.

| Key to the drawing |
|---|
| 1 Top shell |
| 2 Bottom shell |
| 3 Oil intake opening (oil inlet opening) |
| 4 Oil outlet |
| 5 Intake tube |
| 6 Spring |
| 7 Spacer |
| 8 Oil pan base |
| 9 Spring guide pin |
| 10 Seal |
| 11 Swelling |

What is claimed:

1. A suction oil filter for transmissions or engines with a top shell, a bottom shell, with an oil intake opening and an oil outlet, said suction oil filter being positioned in an oil pan or in the transmission housing, characterized in that the oil intake opening has arranged therein a movable intake tube which is pressed by resilient means mounted on the inside of the intake tube outwards onto the oil pan base or the transmission housing and an oil intake opening is thus created at a defined constant distance from the oil pan base or transmission housing.

2. The suction oil filter according to claim 1, wherein the resilient means is a spring.

3. The suction oil filter according to claim 1, wherein the oil intake opening is situated in the bottom shell.

4. The suction oil filter according to claim 1, wherein the intake tube has one or more spacers on its outside.

5. The suction oil filter according to claim 4, wherein the spacers are one or more pins.

6. The suction oil filter according to claim 1, wherein the suction tube has another pin on its inside, on which one end of the spring is mounted.

7. The suction oil filter according to claim 6, wherein the other end of the spring is mounted against the top shell or the pin of the top shell.

8. The suction oil filter according to claim 1, wherein the intake tube has sealing means which seal the outer rim of the intake tube against the inner rim of the intake opening.

9. The suction oil filter according to claim 8, wherein the sealing means is an O-ring.

10. The suction oil filter according to claim 1, wherein the intake tube has at its top end a continuous or discontinuous all-round swelling so that the intake tube cannot slide down out of the intake opening.

* * * * *